Oct. 5, 1943.    N. P. OSTMAN    2,330,910
WINDROW LIFTER
Filed Nov. 27, 1941

INVENTOR.
NELS P. OSTMAN
BY HIS ATTORNEYS
Williamson & Williamson

Patented Oct. 5, 1943

2,330,910

UNITED STATES PATENT OFFICE 2,330,910

WINDROW LIFTER

Nels P. Ostman, Moorhead, Minn.

Application November 27, 1941, Serial No. 420,646

4 Claims. (Cl. 56—372)

This invention relates to machines for gently lifting without materially displacing the grain in a windrow, to enable a harvesting machine to more efficiently pick up and receive the cut grain.

In the larger grain fields the standing grain is cut with a "swather" which merely cuts the grain and forms windrows in the field. The cut grain in the windrow is subsequently picked up by a harvester or combine utilizing a reel and is threshed as the machine is driven over the field. If the grain in the windrow lies for some time before being picked up or if showers fall it becomes matted against the ground or in the stubble and is difficult to pick up with a harvesting machine.

It is an object of my present invention to provide a simple, comparatively inexpensive and highly efficient device which can be driven over the windrows to lift up the cut and matted grain above the stubble permitting speedy aeration and drying of the same and to dispose the grain in uplifted position where practically all of it will be picked up by the harvester or combine.

It is a further object to provide a device of the class described wherein a gentle and effective lifting action is obtained upon the grain of a windrow without stirring, spreading or scattering the grain from the windrow.

More specifically it is an object to provide a windrow lifter wherein through a revolving set of tines a raking, lifting and dropping effect is obtained upon the cut grain in a windrow without disturbing the grain materially and without any scattering or spreading of the grain laterally or to any extent longitudinally of the windrow.

These and other objects and advantages of the invention will more fully appear from the following description made in connection with the accompanying drawing, wherein like reference characters refer to the same parts throughout the views, and, in which.

Figure 1:
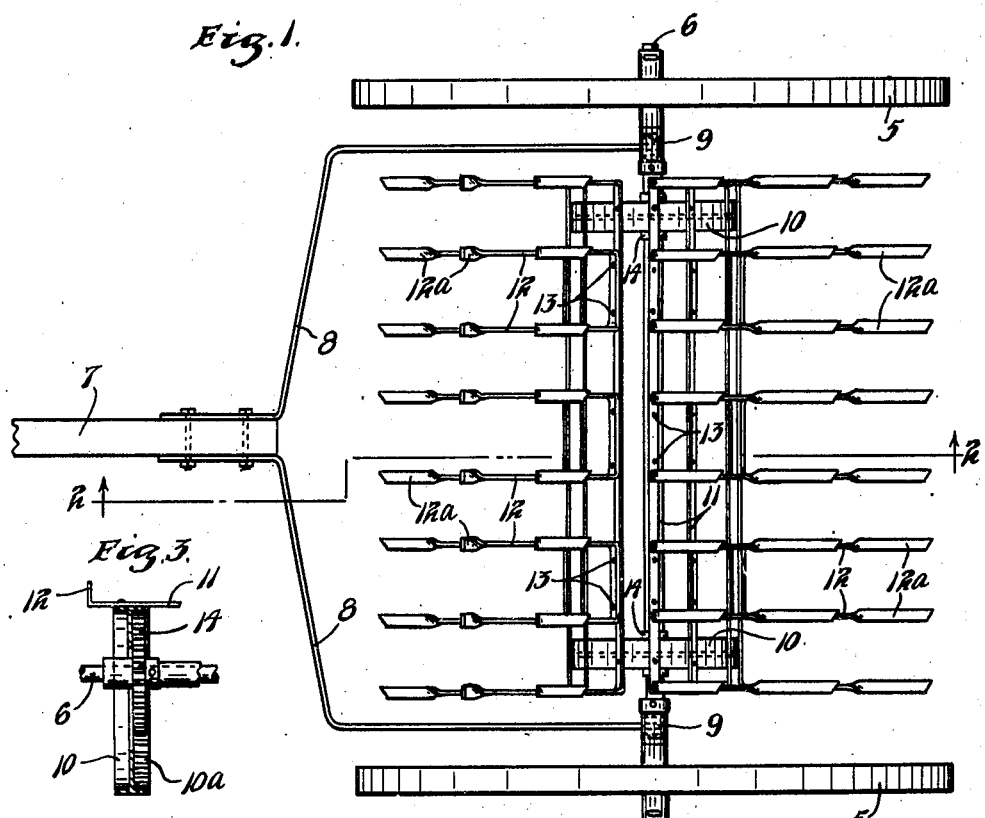
Fig. 1 is a top plan view of a simple embodiment of my invention.
Figure 3:
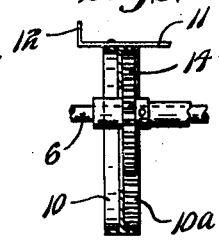
Fig. 3 is a section taken on the line 3—3 of Fig. 2 showing the driving engagement and mechanism between the driving axle and lifting reel.
Figure 2:
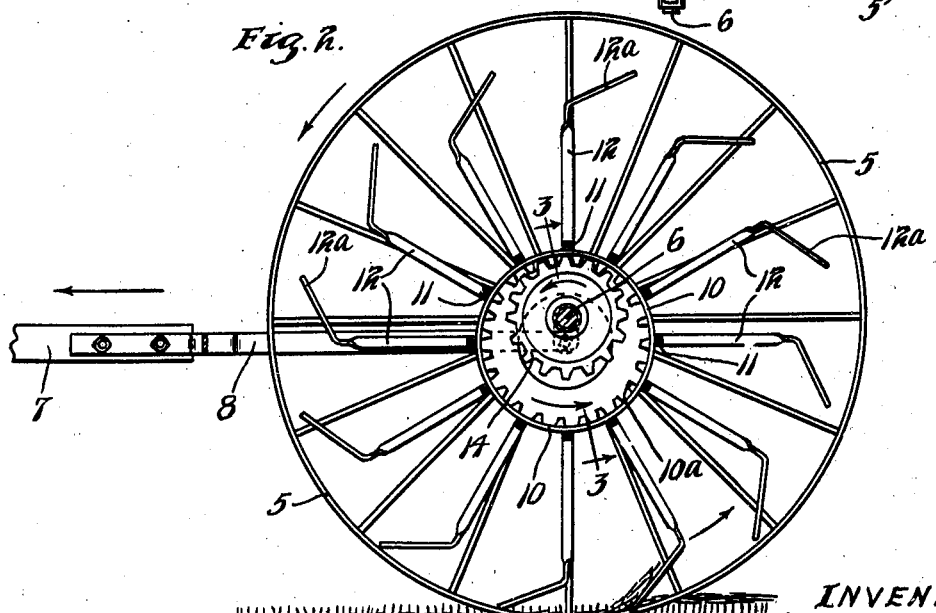
Fig. 2 is a side elevation of the same.

In the form of my invention illustrated the device is mounted and carried on a pair of relatively large ground engaging wheels 5 as shown rigidly connected with a transverse horizontal driving axle 6 which connects the two wheels. It is, of course, contemplated that a clutch or clutch elements may be employed between the wheels and driving axle if desired to disengage driving engagement when the wheels are turned and also to permit rearward travel of the machine without driving the axle 6. An elongated centrally disposed draft bar 7, as shown, is connected with the axle by two straps 8 forming a fork, the ends of straps 8 being secured to mounting sleeves 9 which journal the end portions of driving axle 6 adjacent the inner faces of the two carrier wheels. The draft bar 7 is, of course, adapted to be connected with a team, tractor or vehicle for pulling the machine over the ground.

I provide a revoluble reel equipped with a multiplicity of radially arranged lifting elements or tines, said reel, as shown, comprising a pair of relatively large internal gear wheels 10 one disposed at each end of the reel and connected together by a series of mounting and re-enforcing bars 11 spaced circumferentially in the circumference of a cylinder. The lifting elements or tines 12 are secured to said bars 11 by suitable and preferably detachable means such as screws 13 and have shanks which extend, as shown, radially of the reel terminating in angularly bent lifting fingers 12a, said lifting fingers being bent preferably at an obtuse angle in relation to the shanks and bent in a direction so that their extremities project forwardly of the shanks in engagement with the grain to be lifted during the forward travel of the machine over the ground. As shown, the extremities of the lifting fingers are defined by oblique lines relative to the narrow blade portions terminating in points at one longitudinal edge thereof.

The lifting reel is supported upon and driven by the driving axle 6 and disposed, as shown, in eccentric relation thereto. To these ends the gear wheels 10 have their outer faces disposed towards the inner faces of the adjacent carrier wheels and have their annular flanges provided on the interior thereof with gear teeth 10a constituting a relatively large internal gear. Each of said gears so formed by the wheels 10 is supported upon and meshed with one of a pair of driving gears 14 fixed to the driving axle 6 and of considerably less diameter than that of the internal gear wheels 10. The lifting reel and tines or lifting elements 12 are, therefore, driven and revolved by the driving axle in the same rotary direction as, but at considerably lower speed ratio, than the carrier wheels 5. In the embodiment illustrated the diameter of the driving gears 14 is approximately four-sevenths (4/7) of the diameter of the internal gear 10a although considerable variance can be made in these driving gear ratios to produce satisfactory results all within the scope of my invention. It is essential, however, that the feet per minute travel of the outer ends of the lifting elements 12 be less than the feet per minute travel of the device over the ground.

In operation the device is drawn behind a tractor or horse lengthwise of the windrow, the swath operated on by the multiplicity of lifting elements 12 being adequate to cover the widest windrows formed by conventional "swathers" or cutters. In the revolution of the lifting reel the angularly bent fingers 12a of the elements engage the grain with a very light raking effect, but due to the fact that these fingers are revolved in the same direction as the wheels instead of displacing or longitudinally moving the grain, they lift up the same and subsequently release the grain as the fingers successively are moved from juxtaposition to the ground rearwardly and upwardly. Thus engagement with the stocks of cut grain is released, but in the action described the grain is lifted upwardly to the top of the stubble, freed from its matted condition and left at the top of the stubble where it will readily dry and can be efficiently picked up by the harvester or combine. There is no scattering or spreading action in the operation of my machine and very little longitudinal displacement of the grain due to the speed synchronization between the travel of the machine and feet per minute rotation of the wheels and the slower feet per minute revolution of the lifting elements at slower speed.

Extensive actual usage of the machine has demonstrated high efficiency for the purposes intended.

It will, of course, be understood that various changes may be made in the form, details, arrangement and proportions of the various parts without departing from the scope of my invention.

What is claimed is:

1. A machine for lifting the cut grain in a windrow having in combination, at least a pair of ground engaging wheels, a rotary lifting element member mounted on an axis lying in a common plane with the axis of at least one of said wheels, said member having a multiplicity of circumferentially and also longitudinally spaced outwardly extending lifting elements attached thereto, the ends of said elements being disposed in an approximately cylindrical surface disposed substantially tangentially of the ground upon which said machine travels, and extending oppositely to the direction of rotation of said rotary member and driving connections between at least one of said wheels and said member for revolving said member in the same direction as, but at slower speed than, the rotation of said wheel.

2. A machine for lifting without spreading or scattering, the cut grain in a windrow comprising, a driving axle, a horizontal rotary lifting member, carrier wheels for supporting said driving axle, a multiplicity of lifting elements arranged about said driving axle and secured to said rotary member and having outer ends disposed approximately in a common substantially cylindrical surface disposed tangentially with reference to the ground, and driving connections between at least one of said wheels and said rotary member for driving said member in the same direction as said wheel but at a slower speed whereby the feet per minute travel of the extremities of said elements will be less than the travel of said machine over the ground.

3. The structure set forth in claim 2 wherein the extremities of said elements extend forwardly and downwardly at their lowermost positions of operation.

4. A machine for lifting without scattering or spreading, the cut grain in a windrow having in combination, a pair of ground engaging carrier wheels, a driving axle connected with at least one of said wheels, a series of outwardly extending lifting elements circumferentially arranged about said driving axle with their outer extremities disposed substantially in a common symmetrical and annular surface, a reel surrounding said driving axle to which said elements are secured, said reel having an axially disposed relatively large internal gear and a gear fixed to said axle and meshed with said internal gear but of smaller diameter for driving said reel in the same direction as the rotation of said wheel but at a lower speed, said elements when positioned below the axis of said reel extending forwardly for lifting action.

NELS P. OSTMAN.